United States Patent [19]
Bongaerts et al.

[11] Patent Number: 5,805,122
[45] Date of Patent: Sep. 8, 1998

[54] VOLTAGE DRIVING WAVEFORMS FOR PLASMA ADDRESSED LIQUID CRYSTAL DISPLAYS

[75] Inventors: Petrus Franciscus Gerardus Bongaerts, Waalre; Jacob Bruinink, Eindhoven; Adrianus Leonardus Josephus Burgmans, Eindhoven; Henri Roger Jules Richard Van Helleputte, Eindhoven, all of Netherlands; Babar Ali Khan, Ossining, N.Y.; Karel Elbert Kuijk, Dommelen, Netherlands

[73] Assignee: Philips Electronics North America Corporation, New York, N.Y.

[21] Appl. No.: 359,248

[22] Filed: Dec. 16, 1994

[51] Int. Cl.$^6$ .................................................. G09G 3/36
[52] U.S. Cl. ........................... 345/60; 315/169.3; 345/68
[58] Field of Search .................................. 345/60, 87, 84, 345/67, 76, 68, 66, 75; 359/54, 51, 52; 315/167, 169.3; 313/496

[56] References Cited

U.S. PATENT DOCUMENTS

| | | | |
|---|---|---|---|
| 4,684,849 | 8/1987 | Otsuka et al. | 345/68 |
| 4,896,149 | 1/1990 | Buzak et al. | 340/794 |
| 4,924,218 | 5/1990 | Weber et al. | 345/68 |
| 5,028,916 | 7/1991 | Ichikawa et al. | 345/90 |
| 5,077,553 | 12/1991 | Buzak | 340/794 |
| 5,087,858 | 2/1992 | Cherry et al. | 345/76 |
| 5,159,325 | 10/1992 | Kujik et al. | 345/84 |
| 5,272,472 | 12/1993 | Buzak | 345/60 |
| 5,276,384 | 1/1994 | Martin | 313/582 |
| 5,408,245 | 4/1995 | Kakizaki | 345/67 |
| 5,414,440 | 5/1995 | Ilcisn et al. | 345/60 |
| 5,453,660 | 9/1995 | Martin et al. | 345/60 |
| 5,471,228 | 11/1995 | Ilcisin et al. | 345/60 |
| 5,519,520 | 5/1996 | Stoller | 345/66 |
| 5,523,771 | 6/1996 | Kim | 345/60 |

OTHER PUBLICATIONS

Buzak et al. "A 16-Inch Full Color Plasma Addressed Liquid Crystal Display", Digest of Tech. Papers, 1993 SID Int. Symp., Soc. for Info. Disp. pp. 883–886.

*Primary Examiner*—Steven J. Saras
*Assistant Examiner*—John Suraci
*Attorney, Agent, or Firm*—John C. Fox

[57] ABSTRACT

A plasma-addressed electro-optic display device having a layer of electro-optic material, data electrodes coupled to the electro-optic layer and adapted to receive data voltages for activating portions of the electro-optic layer, and a plurality of plasma channels extending generally transverse to the data electrodes for selectively switching on the electro-optic portions. The plasma channels each contain spaced elongated cathode and anode plasma electrodes and an ionizable gas filling. The cathode and anode electrodes are arranged in groups to reduce the connections required. Reference voltages are applied to the grouped cathode and anode electrodes such that the data voltages required to operate the panel are reduced decreasing vertical crosstalk. Various driving voltage waveforms can be used for further crosstalk reduction, to reduce the number of voltage levels required, and cause the cathode and anode electrodes to exchange roles during operation to extend lifetime.

16 Claims, 7 Drawing Sheets

1

VOLTAGE DRIVING WAVEFORMS FOR PLASMA ADDRESSED LIQUID CRYSTAL DISPLAYS

This invention relates to plasma-addressed electro-optic display panels, and in particular to the electrode connections within and voltage driving waveforms for operating such displays.

BACKGROUND OF INVENTION

Plasma-addressed liquid crystal display panels, commonly referred to as "PALC" display devices, comprise, typically, a sandwich of: a first substrate having deposited on it parallel transparent column electrodes, commonly referred to as "ITO" columns or electrodes since indium-tin oxides are typically used, on which is deposited a color filter layer for a color display, or ITO columns fabricated on a color filter that is provided on the first substrate; a second substrate comprising parallel sealed plasma channels, corresponding to rows of the display crossing all of the ITO columns, each of which is filled with a low pressure ionizable gas, such as helium, and containing spaced cathode and anode electrodes along the channel for ionizing the gas to create a plasma, which channels are closed off by a thin transparent dielectric sheet; and an electro-optic material such as a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel in the row to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of each LC pixel to backlight or incident light is a function of the stored voltage across the pixel. A more detailed description is unnecessary because the construction, fabrication, and operation of such PALC devices have been described in detail in the following U.S. patents, and publication, the contents of which are hereby incorporated by reference: U.S. Pat. Nos. 4,896,149; 5,077,553; 5,272,472; 5,276,384; 5,349,454; and Buzak et al., "A 16-Inch Full Color Plasma Addressed Liquid Crystal Display", Digest of Tech. Papers, 1993 SID Int. Symp., Soc. for Info. Displ. pp. 883–886

It is known from U.S. Pat. No. 5,077,553 that the number of connections of a PALC display panel can be decreased using a method as depicted in FIG. 1. Assuming a PALC display panel 12 with N rows of pixels, both the cathodes 30 and anodes 31 electrodes are taken together in groups of $N^{1/2}$ lines, with one connection 8, 9 per group. This leads to $2N^{1/2}$ connections. For instance, with N=1024, there are 2×32 groups of 32 lines, resulting in 64 connections. FIG. 1 illustrates one form of this system in which all the cathodes are arranged in groups 30-1 . . . 30-√N, and in which the anode electrodes are also arranged in groups 31-1 . . . 31-√N but with each anode associated with one of the cathode groups. In other words, each of the cathode groups include no more than one electrode of each anode group. In the same way, each of the anode groups include no more than one electrode of each cathode group. The adjacent cathode-anode electrode pairs are each located in a channel, and the channels whose electrodes form any one of a first group thus include no more than one electrode of any one of the second group.

This display may be driven in the following way. The maximum voltage needed is equal to or larger than the ignition voltage $V_{ig}$ for igniting the plasma in a channel, and the minimum voltage needed is equal to or less than the sustain voltage $V_{sus}$ for sustaining the discharge in a channel once ignited. One of the cathode groups which includes the cathode electrode in the channel to be selected is driven with a voltage $-\frac{1}{2}(V_{ig}+V_{sus})$ during an ignition time $T_{ig}$, while all other cathode groups have zero voltage as a reference during that ignition time $T_{ig}$. After the time $T_{ig}$, all cathode voltages are set to the reference zero voltage during the rest of the row time $(T_{ROW}-T_{ig})$. One anode group which includes the anode electrode in the selected channel is driven with a voltage $\frac{1}{2}(V_{ig}-V_{sus})$ during $T_{ig}$, while all other anode groups are driven with a voltage of $-\frac{1}{2}(V_{ig}-V_{sus})$ during that same time. During the rest of the row time, the anode voltages are maintained at the zero reference. With these applied voltages, only for one pair of cathode and anode electrodes in the selected channel is the voltage difference equal to $V_{ig}$, so this pair only will ignite their channel during $T_{ig}$. For all other anode-cathode pairs, the voltage difference during $T_{ig}$ is either $-V_{sus}$ or $\pm\frac{1}{2}(V_{ig}-V_{sus})$, so these channels will not ignite. In this way the panel can be scanned from top to bottom.

The disadvantage of this method is that a large column voltage range is needed, equal to $2V_{sat}^*$, where $V_{sat}^*$ is the voltage required to be applied to the series combination of the liquid crystal cell and the thin dielectric microsheet separating the plasma channel and the LC to drive the LC to its saturation voltage $V_{sat}$. For this background analysis, the color filter, which if present, also contributes to the required value of $V_{sat}^*$ is ignored. One can define $V_{sat}^*=\alpha_{sat}V_{sat}$, where $\alpha_{sat}$ is the attenuation ratio of the column voltage to the LC voltage at saturation. Similarly, one can define $V_{th}^*=\alpha_{th}V_{th}$, where $V_{th}$ is the threshold voltage of the LC and $\alpha_{th}$ is the attenuation ratio of the column voltage to the LC voltage at threshold. These values are indicated in FIG. 2, which is a known graph 2 plotting relative transmission for a typical LC material as a function of the voltage across an LC pixel, and graph 3 is a similar characteristic but now taking into account the voltage drop across the thin microsheet.

It will be clear from FIG. 2 that this value $2V_{sat}^*$ is a large value, difficult to generate in the column-driving integrated circuit components (ICs), and will lead to capacitive crosstalk on pixels in the same column that are in the non-addressed mode storing a charge from a previous addressing step, known in the art as vertical crosstalk.

SUMMARY OF INVENTION

An object of the invention is an improved display device.

Another object of the invention is a display device requiring reduced column driving voltages.

A further object of the invention is a display device exhibiting reduced vertical crosstalk.

Still another object of the invention is a display device requiring fewer different types of column driving ICs.

In accordance with a first aspect of the invention, a display device comprises an electrode connection arrangement of the reduced connection type as described which is driven with voltages such that during the remaining row time ($T_{ROW}-T_{ig}$), when the data voltage is applied to the column electrode, reference voltages are applied to the anode and cathode electrodes in the relevant groups substantially equal to $\pm V_c^*$, where $V_c^* = \frac{1}{2}(V_{th}^* + V_{sat}^*)$. In this way, the required column voltage swing is reduced to $(V_{sat}^* - V_{th}^*)$. This will lead to less vertical crosstalk. By relevant groups is meant the groups containing the cathode and anode electrodes in the selected channel just previously ignited.

An even further reduction in vertical crosstalk can be obtained in acordance with another aspect of the invention by rearranging the connections to the cathode and anode electrodes such that the anode connections to all even-numbered cathode groups are shifted by one, and modifying the scanning of the even-numbered cathode group electrodes.

In accordance with a further aspect of the invention, the number of different voltages needed to operate the display panel is reduced by applying a voltage to a selected cathode group substantially equal to $-\frac{1}{2}V_{ig}$, and applying to a selected anode group a voltage substantially equal to $+\frac{1}{2}V_{ig}$. With this feature, only five voltage levels are required to operate the display panel, and the voltages are the same for both cathode and anode groups, thus reducing the types of ICs needed to drive both groups.

In a prefered embodiment, the display is written in the row-inversion mode. This means that in one field the pixels of the first row are written in a positive sense, the pixels of the second row in a negative sense, the pixels of the third row in a positive sense, and so on. On the next field these signs are inverted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 3:
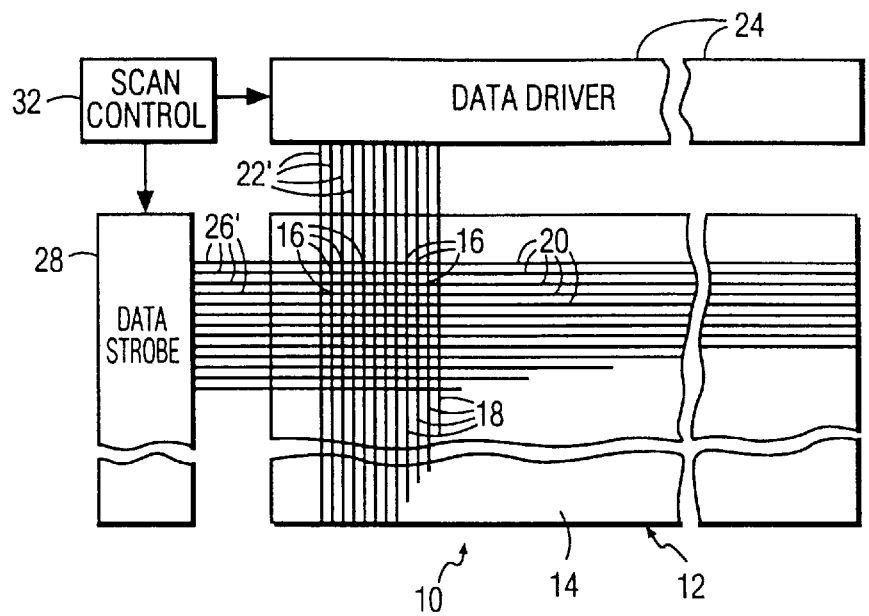
FIG. 3 is a schematic block diagram of a conventional flat panel display system.

FIG. 3 shows a flat panel display system 10, which represents a typical PALC display device and the operating electronic circuitry. With reference to FIG. 3, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34, and the channel rows are usually built into a second transparent substrate 36. Skilled persons will appreciate that certain systems, such as reflective display of either the direct view or projection type, would require that only one substrate be optically transparent.

Column electrodes 18 receive data drive signals of the analog voltage type developed on parallel output conductors 22' by different ones of output amplifiers 23 (FIG. 4) of a data driver or drive drive circuit 24, and channels 20 receive data strobe signals of the voltage pulse type developed on parallel output conductors 26' by different ones of output amplifiers 21 (FIG. 4) of a data strobe or strobe means or strobe circuit 28. Each of the channels 20 includes a reference electrode 30 (FIG. 4) to which a reference potential common to each channel 20 and data strobe circuit 28 is typically applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited to display panels with liquid crystal materials. A color filter (not shown) may be positioned within display panel 12 to develop multi-colored images of controllable color intensity. For a projection display, color can also be achieved by using three separate monochrome panels 12, each of which controls one primary color.

Figure 4:
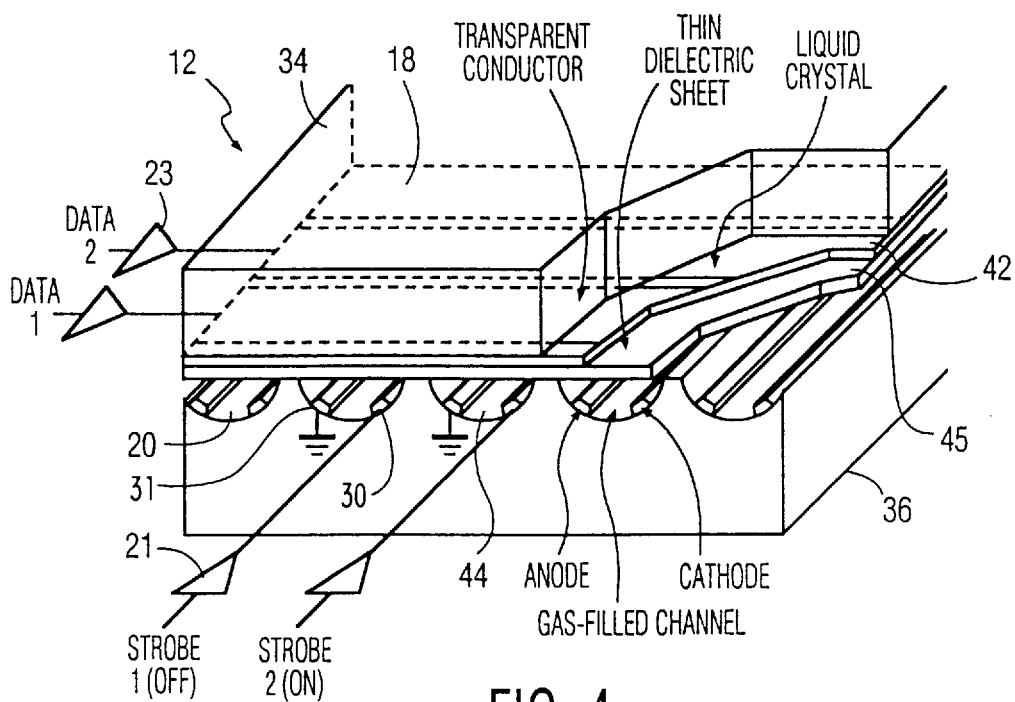
FIG. 4 is a perspective view of part of a conventional PALC display device.

FIG. 4 illustrates the PALC version of such a display panel using LC material. Only 3 of the column electrodes 18 are shown. The rows 20 are constituted by a plurality of parallel elongated sealed channels underlying (in FIG. 4) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 31 in the prior art arrangement is typically grounded and is commonly called the anode. The second electrode 30 is called the cathode, because to it will typically be supplied relative to the anode electrode a negative strobe pulse sufficient to cause electrons to be emitted from the cathode 30 to ionize the gas. As explained above, each channel 20, in turn, has its gas ionized with a strobe pulse to form a plasma and a reference potential connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid crosstalk.

All of the methods described in the referenced patents and publication will be suitable for making the channels and electrodes for the panel of the invention.

Figure 1:
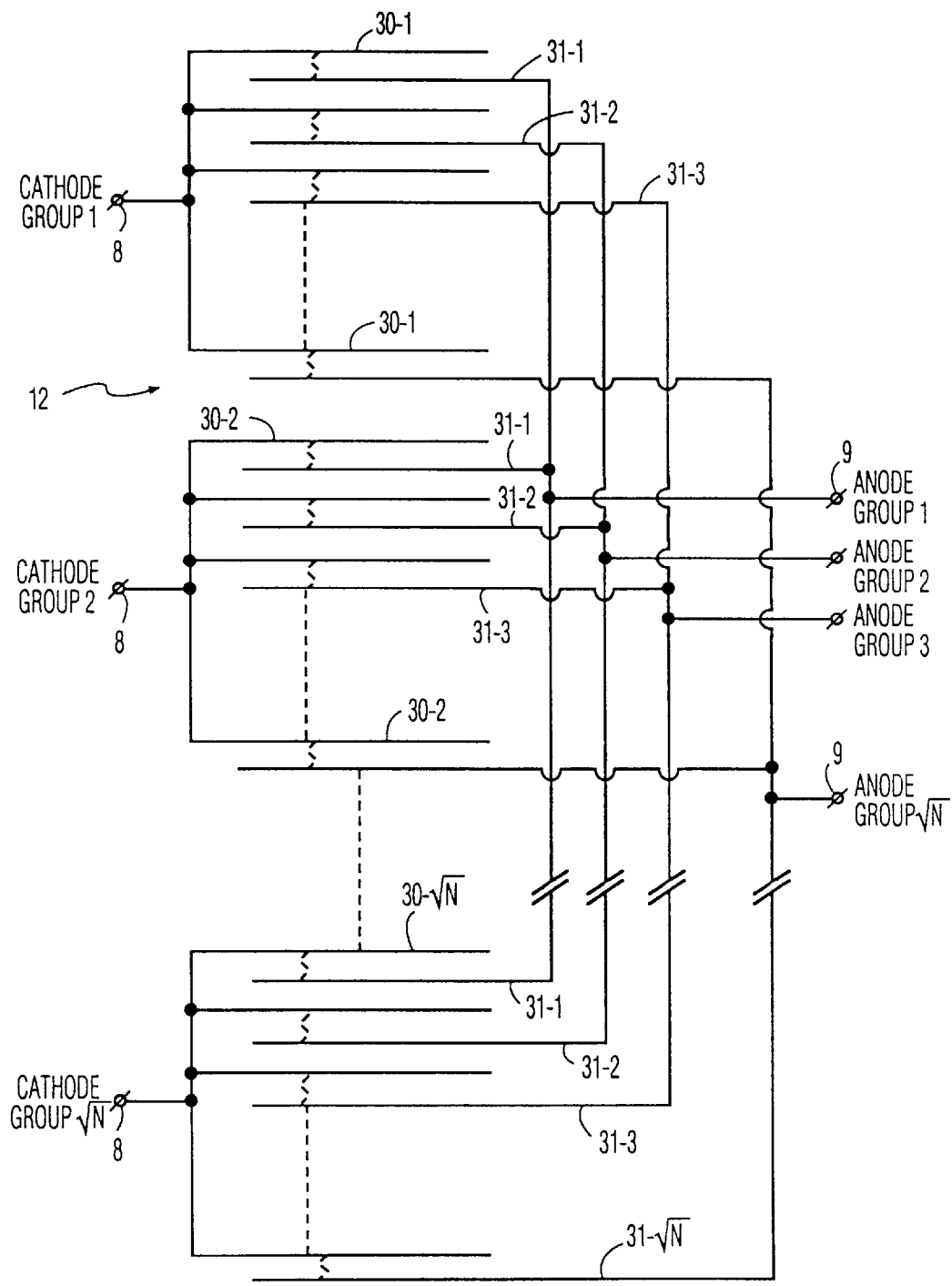
FIG. 1 is a circuit schematic of a known arrangement of channel cathode and anode electrode connections into plural groups for voltage driving purposes.

In accordance with the invention, a PALC display having the reduced number of connections of the type illustrated in FIG. 1 is driven with the waveforms of FIGS. 5a–5d in a row-inversion mode and in such manner that the voltage applied during the remaining row time to the relevant cathode and anode electrodes are substantially equal to $\pm V_C^*$. Row-inversion mode means that, in one field the pixels of the first row are written in a positive sense, the pixels of the second row in a negative sense, the pixels of the third row in a positive sense, and so on; thus, all odd-row pixels in a positive sense and all even-row pixels in a negative sense. On the next field, the polarities are inverted so that all odd-row pixels are written to in a negative sense and all even-row pixels in a positive sense. By using the extra voltage levels, $\pm V_C^*$, as the reference voltages in the row drive waveforms for the selected channel, vertical crosstalk can be reduced.

Figure 2:
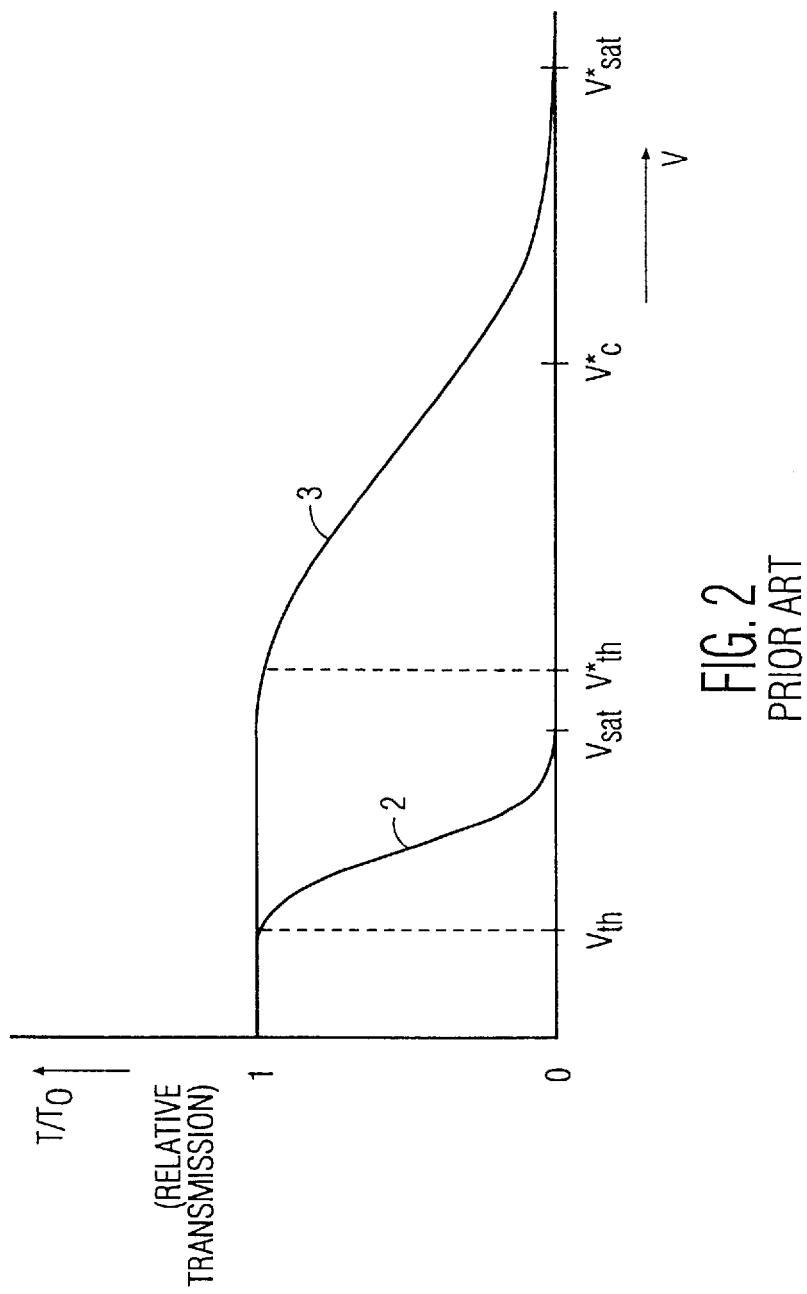
FIG. 2 is a typical transmission vs. voltage curve for an LC material.

FIGS. 5a–5d are aligned vertically and show the corresponding row time $T_{ROW}$ and the ignition time $T_{ig}$. During the ignition time $T_{ig}$. the column voltage is maintained at zero (for clarity reasons) but this is not necessary. During this same time, the anode and cathode electrode voltages are as shown in FIG. 5, namely, during the first row time 60, the group 1 cathode of the selected channel is set to a voltage of $-\frac{1}{2}(V_{ig}+V_{sus})$, the anode group 1 of the selected channel is set at a voltage $+\frac{1}{2}(V_{ig}+V_{sus})$, and the remaining anode groups are set at $-\frac{1}{2}(V_{ig}-V_{sus})$. During the remaining row select time, $T_{ROW}-T_{ig}$ (where the row time $T_{ROW}$ is equal to the field time $T_F$ divided by the number of rows N, $T_{ROW}=T_F/N$), the voltages of the anode and cathode groups included in the selected channel are maintained at the new reference voltage values $\pm V_C^*=\pm\frac{1}{2}(V_{th}^*+V_{sat}^*)$. This means that during the ignition time, only a selected cathode of group 1 and a selected anode of group 1 have applied between them a voltage equal to the plasma ignition voltage and the gas filling in that channel will ignite. In all the other non-selected channels, the maximum voltage present during this ignition time is $V_{sus}$ only, well below the ignition voltage. $V_C^*$, as shown in FIG. 2, is the average voltage value of $V_{th}^*$ and $V_{sat}^*$, which equals ½ the sum of $V_{th}^*$ and $V_{sat}^*$. During the remaining row time, $-V_C^*$ as a reference voltage is applied to the cathode and anode electrodes of group 1 while the column voltages are applied. Thus, when a column voltage is zero (not shown), the voltage applied across the pixel is $V_C^*$ whereas the maximum peak-to-peak column voltage required is $(V_{sat}^*-V_{th}^*)$, which is considerably below the value of $2V_{sat}^*$ required for the prior art system. Since the column voltage range is decreased to $(V_{sat}^*-V_{th}^*)$, less vertical crosstalk on pixels in the same column that are in the hold mode will occur.

When possible, the anode and cathode electrodes in the other non-addressed groups of the non-addressed channels are maintained at zero voltage to assist in maintaining this decrease of crosstalk.

Figure 5A:
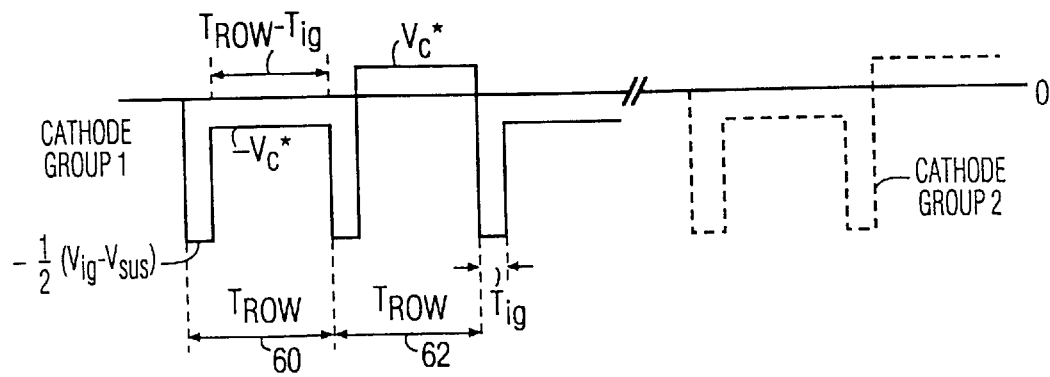
FIGS. 5a–5d are one form of voltage waveforms of the driving voltages for a display panel connected into groups as shown in FIG. 1 in accordance with the invention.
Figure 5B:
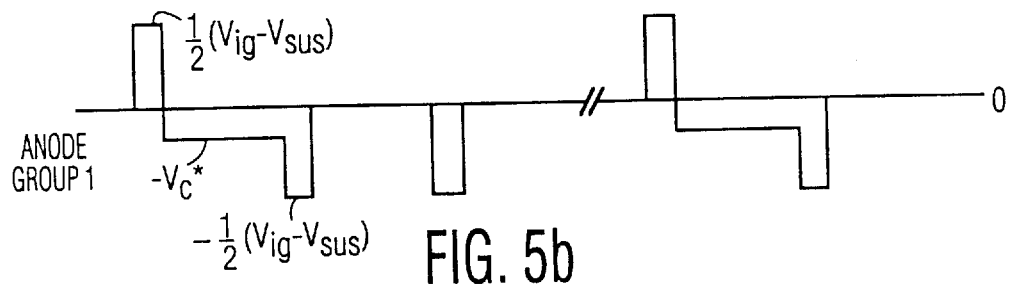
Figure 5C:
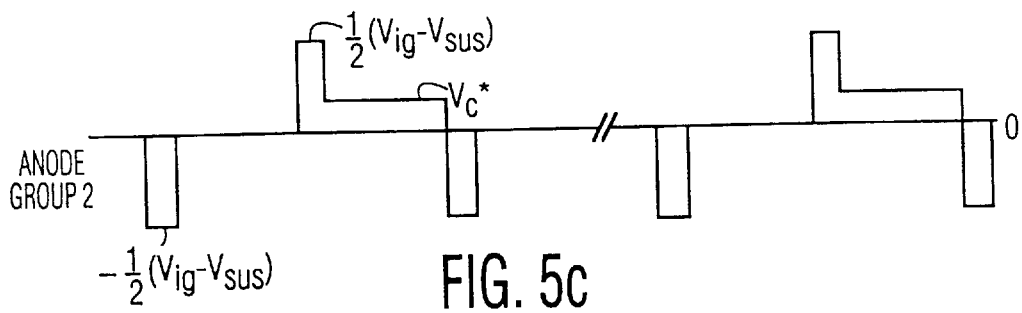
Figure 5D:
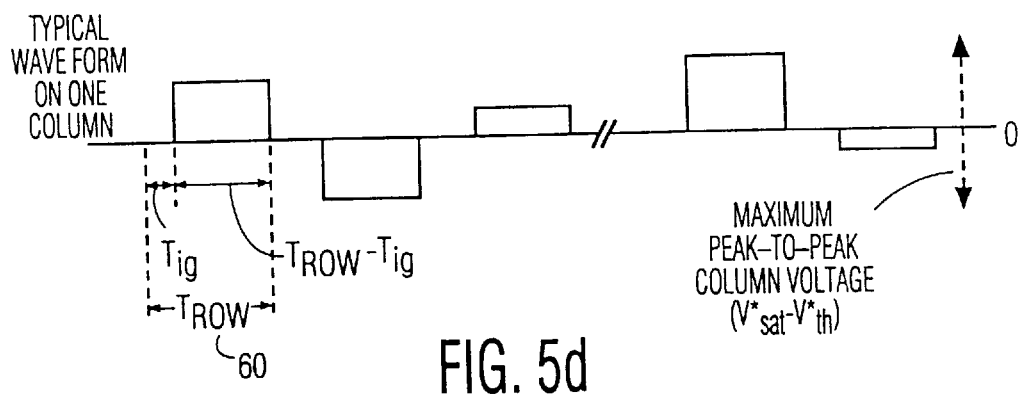

It will be understood that the column voltage values shown in FIG. 5d are arbitrary to indicate different data values, though it will also be evident that FIG. 5d shows the row inversion mode.

During the second row time 62, the voltages previously applied to anode group 1 are applied to anode group 2 and vice-versa, with the result that the next channel ignites, and so on during the remaining row times. Thus, the driving voltages required for this method of operation are as follows: for the cathode groups, 0, $-\frac{1}{2}(V_{ig}+V_{sus})$, $V_C^*$ and $-V_C^*$; for the anode groups, 0, $-\frac{1}{2}(V_{ig}-V_{sus})$, $\frac{1}{2}(V_{ig}-V_{sus})$, $V_C^*$ and $-V_C^*$.

Figure 6:
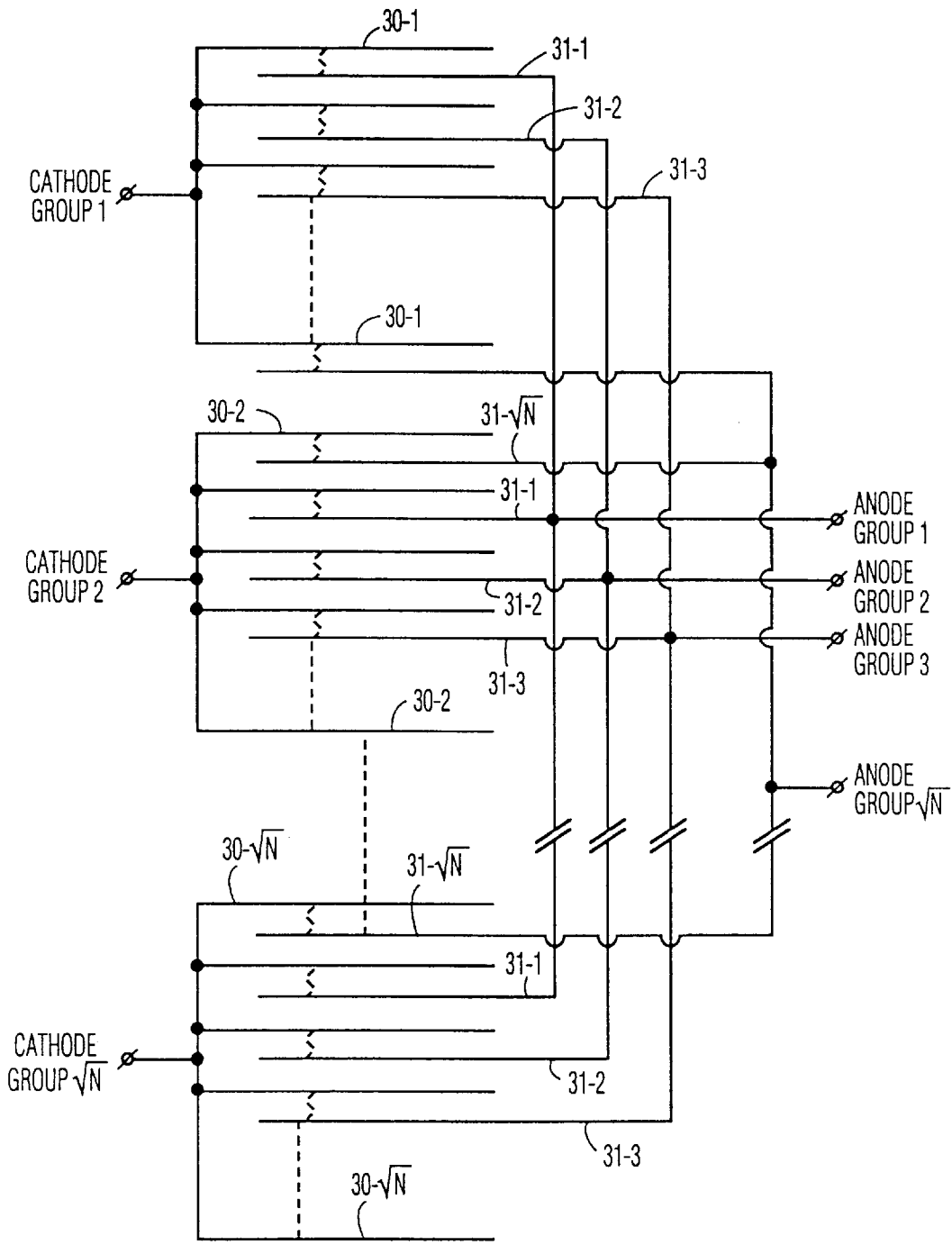
FIG. 6 is a circuit schematic of one form of an arrangement according to the invention for interconnecting the anode and cathode electrodes into groups.

When there is an even number of connections in the cathode groups, the anode voltage waveform of a row will always have the same polarity in one field, as can be seen in FIGS. 5b and 5c. This may lead to a certain vertical crosstalk. To eliminate the latter, in accordance with another aspect of the invention, the anode voltage of a row can be made alternating by shifting the anode connections by one or an odd number for all even-numbered cathode groups, which can be defined as the ith electrode of the second group is paired with one of the (i+1)th, (i+3)th, (i+5)th . . . , or with one of the (i−1)th, (i−3)th, (i−5th)th . . . , electrodes of the first group, where, for the example given, the first group is the cathode group and the second group is the anode group. This is illustrated in FIG. 6. For instance, in cathode group 2, the anode of anode group 1 is located in the 2nd row and paired with the second group 2 cathode, the anode of anode group 2 is located in the third row and paired with the third group 2 cathode, and so on. The location of the anodes in the odd-numbered cathode groups remains the same as in FIG. 1. The anode of the last anode group (also an even number) is located in the 1st row of cathode group 2. The same way of connecting is used in the 4th, 6th, etc. cathode groups. When scanning such an even-numbered cathode group, the scanning procedure of the anode group is modified so that the scanning starts with the last anode group, then the 1st, 2nd, and so on. The pairing of the cathode and anode electrodes for a channel is illustrated in FIG. 6 by a dashed S between the paired electrodes. A similar representation is used in FIG. 1. It will be understood that this feature of the invention is not limited to use with the driving voltage scheme described in connection with FIG. 5 or FIGS. 7 and 8 described below but can also be employed with the voltage driving schemes used for the prior art arrangements such as in FIG. 1.

As indicated above, a number of different voltage levels totalling six in number are needed to drive the system illustrated in FIG. 5. This may require two different types of driving ICs, one type for driving the cathodes and one type for driving the anodes which can increase costs and possibly lead to assembly errors.

Figure 7A:
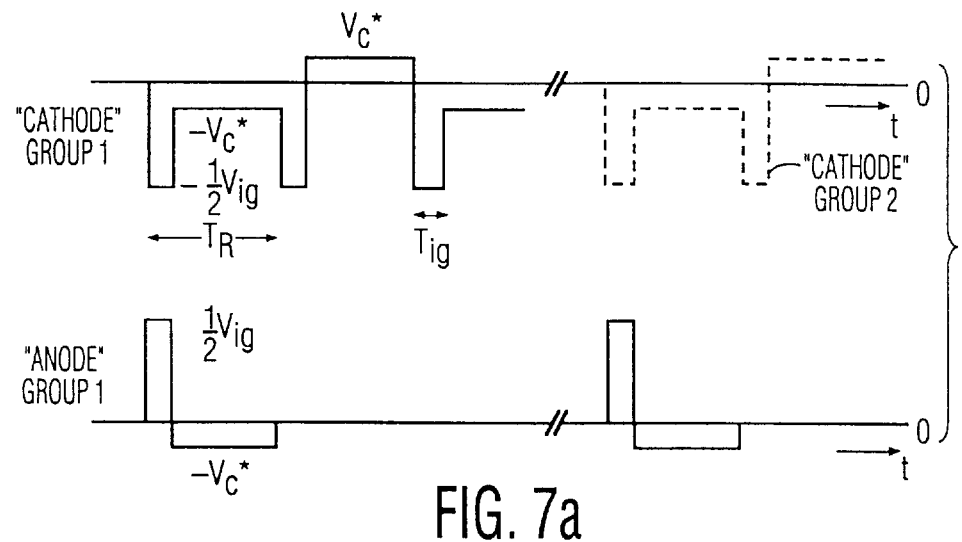
FIGS. 7a–7b are another form of voltage waveforms of the driving voltages for a display panel connected into groups as shown in FIG. 1 in accordance with the invention.
Figure 7B:
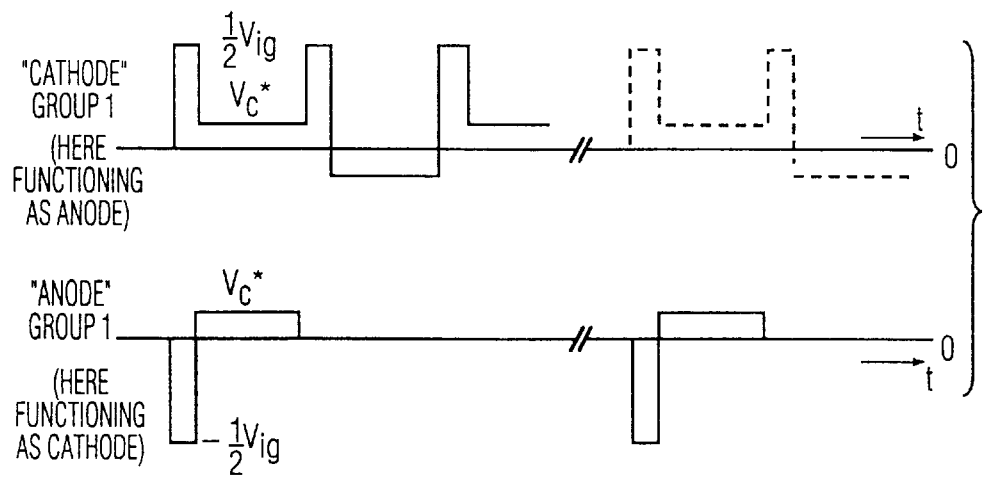

In accordance with another aspect of the invention, the voltage waveforms illustrated in FIGS. 7a–7b can be used to drive the cathode and anode electrodes, the column voltages being the same as in FIG. 5 and thus not being shown. With an ignition voltage $V_{ig}$ required to ignite a plasma, a voltage of ½$V_{ig}$ will be insufficient for ignition, Thus, a selected cathode group 1 in FIG. 7a can be driven with a voltage of $-½V_{ig}$ during the ignition time while all the other cathode groups have 0 volts applied during that same time period. To a selected anode group 1 is applied a voltage of ½$V_{ig}$ while all the other anode groups have 0 volts applied during that same time period. The result is that only the channel with the selected group 1 cathode and group 1 anode has a voltage difference applied equal to $V_{ig}$ and will ignite, whereas all other anode-cathode pairs have a voltage difference of ½$V_{ig}$, $-½V_{ig}$, or 0, so that no ignition can take place there. During the remaining row time, the voltages of the relevant anode and cathode electrodes are kept at $V_C^*$ or $-V_C^*$ as described in connection with FIG. 5.

FIG. 7a illustrates this aspect for two groups for one scanning field. During the next scanning field shown in FIG. 7b, all the voltages are inverted, including the ignition voltages. This means that an electrode that previously functioned as a cathode now functions as an anode, and vice-versa, as illustrated in FIG. 7b.

As a result of these modifications, both the anode and cathode electrode groups need the following voltages: 0, ½$V_{ig}$, $-½V_{ig}$, $V_C^*$, and $-V_C^*$. Thus, both groups can be driven by the same IC type, and the circuitry is simplified as only 5 voltage levels are required.

Another advantage is that sputtering of the cathode that occurs during the existence of the plasma and limits the lifetime of the display is now distributed over two electrodes thereby effectively doubling the display lifetime.

Figure 8A:
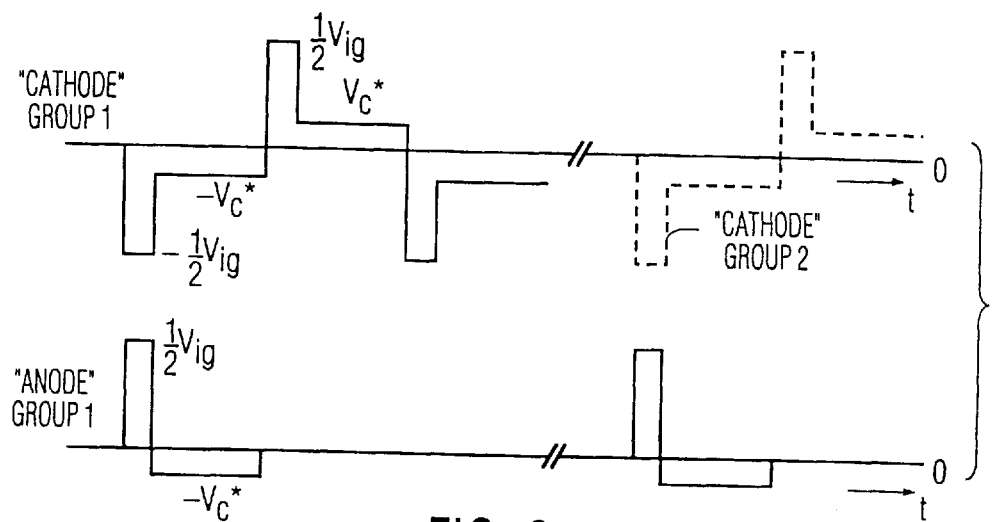
FIGS. 8a–8b are views similar to FIGS. 7a–7b of a modified voltage driving scheme.
Figure 8B:
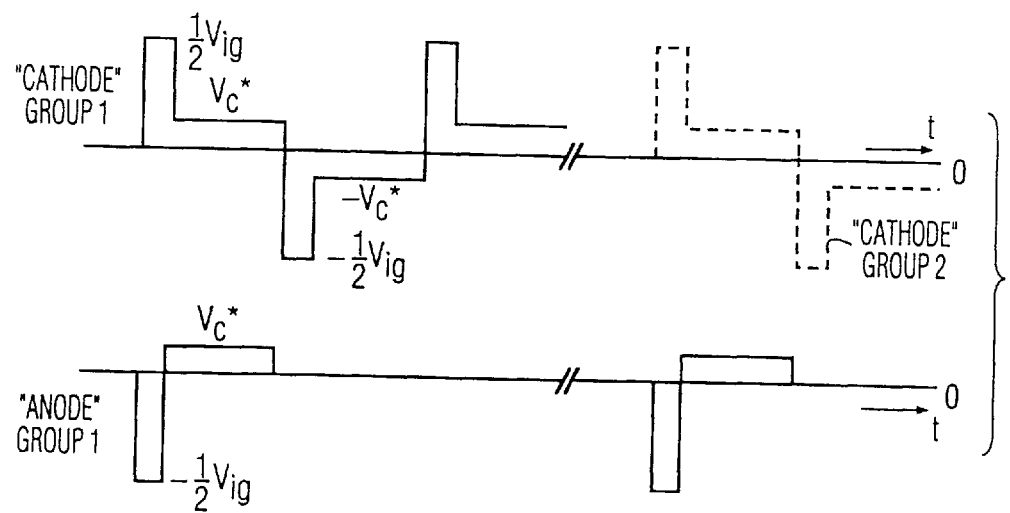

FIGS. 8a and 8b show another way of operating the display to exchange the roles of the cathode and anode and extend the lifetime of the display. In this embodiment, the cathode and anode functions are exchanged not only at alternate fields but also at each row time. Thus, comparing FIG. 7a and FIG. 8a, as an example in the FIG. 7a embodiment, the cathode group 1 functions as a cathode during each odd-numbered field, and as an anode during each even-numbered field, whereas in the FIG. 8a embodiment, the cathode group 1 functions as a cathode during the odd-numbered rows and as an anode during the even-numbered rows of each odd field, and as an anode during the odd-numbered rows and as a cathode during the even-numbered rows of each even field.

It will be understood that functioning as a cathode means that the voltage applied to it is negative relative to the anode so that it emits electrons which are attracted to the more positive anode. It will also be understood that the waveforms shown can be modified to the extent that they are inverted or displaced in time and the even and odd rows and fields reversed while retaining the benefits of the invention.

As an example to illustrate operation in accordance with the embodiment of FIG. 5, which is not meant to be limiting, for a conventional TN LC of a thickness of about 4.3 μm, for 99% transmission, $V_{th}$ equals about 1.7V, and for 1% transmission $V_{sat}$ equals about 4.7V. For a typical display panel, α=4.47@$V_{th}$ and 7.94@$V_{sat}$. With a 30 μm dielectric sheet of glass (dielectric constant=6.7), $V_{th}^*$=7.6V and $V_{sat}^*$=37.3V. The reference voltage $V_C^*$ will then equal for this combination of parameters 32.45V.

It will also be appreciated that the invention is not limited to the specific values given above. It is possible to obtain many of the benefits of the invention with voltages that vary by as much as 10–20% from the values stated above, except that, in the case of the ignition voltage, the value must exceed the ignition value for the gas plasma to be created.

The invention can be used in all kinds of PALC displays that typically have a small channel pitch for use in computer monitors, workstations or TV applications.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A method of operating a plasma-addressed display device comprising a layer of electro-optic material, data electrodes coupled to the electro-optic layer and adapted to receive data voltages for activating portions of the electro-optic layer, and a plurality of elongated plasma channels extending generally transverse to the data electrodes for selectively switching on said electro-optic portions, said plasma channels each comprising spaced cathode and anode electrodes and an ionizable gas filling, the cathode and anode electrodes being interconnected in first and second groups such that each of one group include no more than one of the other group, the method being characterized in that at least during a remaining row time before another channel is ignited, and while the date voltage is being applied to a data electrode, a reference voltage is applied to the electrodes of a group containing an electrode in a selected channel that has been ignited to form a plasma, the reference voltage substantially equal to ±$V_C^*$, where $V_C^*$=½($V_{th}^*$+$V_{sat}^*$), $V_{th}^*$ is the voltage at which a property of the electro-optical material begins to change and $V_{sat}^*$ is the voltage at which no further significant changes in the property takes place.

2. The method of claim 1, characterized in that the device is operated in the row inversion mode such that the data voltages applied to each data electrode alternate in polarity.

3. The method of claim 1, characterized in that during the remaining row time to the electrodes in groups not including the selected channel a voltage substantially equal to 0V is applied.

4. The method of claim 1, characterized in that during ignition time of the selected channel voltages substantially equal to $-½(V_{ig}+V_{sus})$ and $½(V_{ig}-V_{sus})$ are applied respectively to the first and second groups containing the electrodes for the selected channel, where $V_{ig}$ is the voltage required between the electrodes in the selected channel to ignite the plasma and $V_{sus}$ is the voltage required between the electrodes in the selected channel to sustain the plasma.

5. The method of claim 4, characterized in that during ignition time to the electrodes in the second group not including the selected channel is applied a voltage substantially equal $-½(V_{ig}-V_{sus})$.

6. The method of claim 1, characterized in that during ignition time of the selected channel voltages substantially equal to $-½V_{ig}$ and $½V_{ig}$ are applied respectively to the first and second groups containing the electrodes for the selected channel, where $V_{ig}$ is the voltage required between the electrodes in the selected channel to ignite the plasma.

7. The method of claim 6, characterized in that during subsequent scanning fields all the applied voltages are inverted such that the first and second groups alternate as cathode and anode.

8. The method of claim 7, characterized in that during subsequent row scanning times all the applied voltages are inverted such that the first and second groups alternate as cathode and anode.

9. A plasma-addressed display device comprising a layer of electro-optic material, data electrodes coupled to the electro-optic layer and adapted to receive data voltages for activating portions of the electro-optic layer, and a plurality of elongated plasma channels extending generally transverse to the data electrodes for selectively switching on said electro-optic portions, said plasma channels each comprising spaced cathode and anode electrodes and an ionizable gas filling, the cathode and anode electrodes being interconnected in first and second groups such that each of one group include no more than one of the other group, characterized in that means are provided for applying to the electrodes of a group containing an electrode in a selected channel that has been ignited to form a plasma, a reference voltage substantially equal to $\pm V_C^*$ at least during a remaining row time before another channel is ignited, where $V_C^* = \frac{1}{2}(V_{th}^* + V_{sat}^*)$, $V_{th}^*$ is the data voltage at which a property of the electro-optical material begins to change and $V_{sat}^*$ is the data voltage at which no further significant changes in the property takes place.

10. The device of claim 9, characterized in that means are provided for operating the device in the row inversion mode such that the data voltages applied to each data electrode alternate in polarity.

11. The device of claim 9, characterized in that means are provided such that during the remaining row time to the electrodes in groups not including the selected channel a voltage substantially equal to 0 V is applied.

12. The device of claim 9, characterized in that means are provided such that during ignition time of the selected channel voltages substantially equal to $-\frac{1}{2}(V_{ig}+V_{sus})$ and $\frac{1}{2}(V_{ig}-V_{sus})$ are applied respectively to the first and second groups containing the electrodes for the selected channel, where $V_{ig}$ is the voltage required between the electrodes in the selected channel to ignite the plasma and $V_{sus}$ is the voltage required between the electrodes in the selected channel to sustain the plasma.

13. The device of claim 12, characterized in that means are provided such that during ignition time to the electrodes in the second group not including the selected channel is applied a voltage substantially equal to $-\frac{1}{2}(V_{ig}-V_{sus})$.

14. The device of claim 9, characterized in that means are provided such that during ignition time of the selected channel voltages substantially equal to $-\frac{1}{2}V_{ig}$ and $\frac{1}{2}V_{ig}$ are applied respectively to the first and second groups containing the electrodes for the selected channel, where $V_{ig}$ is the voltage required between the electrodes in the selected channel to ignite the plasma.

15. The device of claim 14, characterized in that means are provided such that during subsequent scanning fields all the applied voltages are inverted such that the first and second groups alternate as cathode and anode.

16. The device of claim 15, characterized in that means are provided such that during subsequent row scanning times all the applied voltages are inverted such that the first and second groups alternate as cathode and anode.

* * * * *